May 13, 1924.

F. C. FISCHER

ROTARY MOTOR

Original Filed March 5, 1921    6 Sheets-Sheet 2

1,493,745

WITNESSES

INVENTOR
FRANK C. FISCHER,
BY
ATTORNEYS

May 13, 1924.

F. C. FISCHER

ROTARY MOTOR

Original Filed March 5, 1921    6 Sheets-Sheet 3

WITNESSES

INVENTOR
FRANK C. FISCHER,
BY
ATTORNEYS

May 13, 1924.
F. C. FISCHER
ROTARY MOTOR
Original Filed March 5, 1921   6 Sheets-Sheet 4
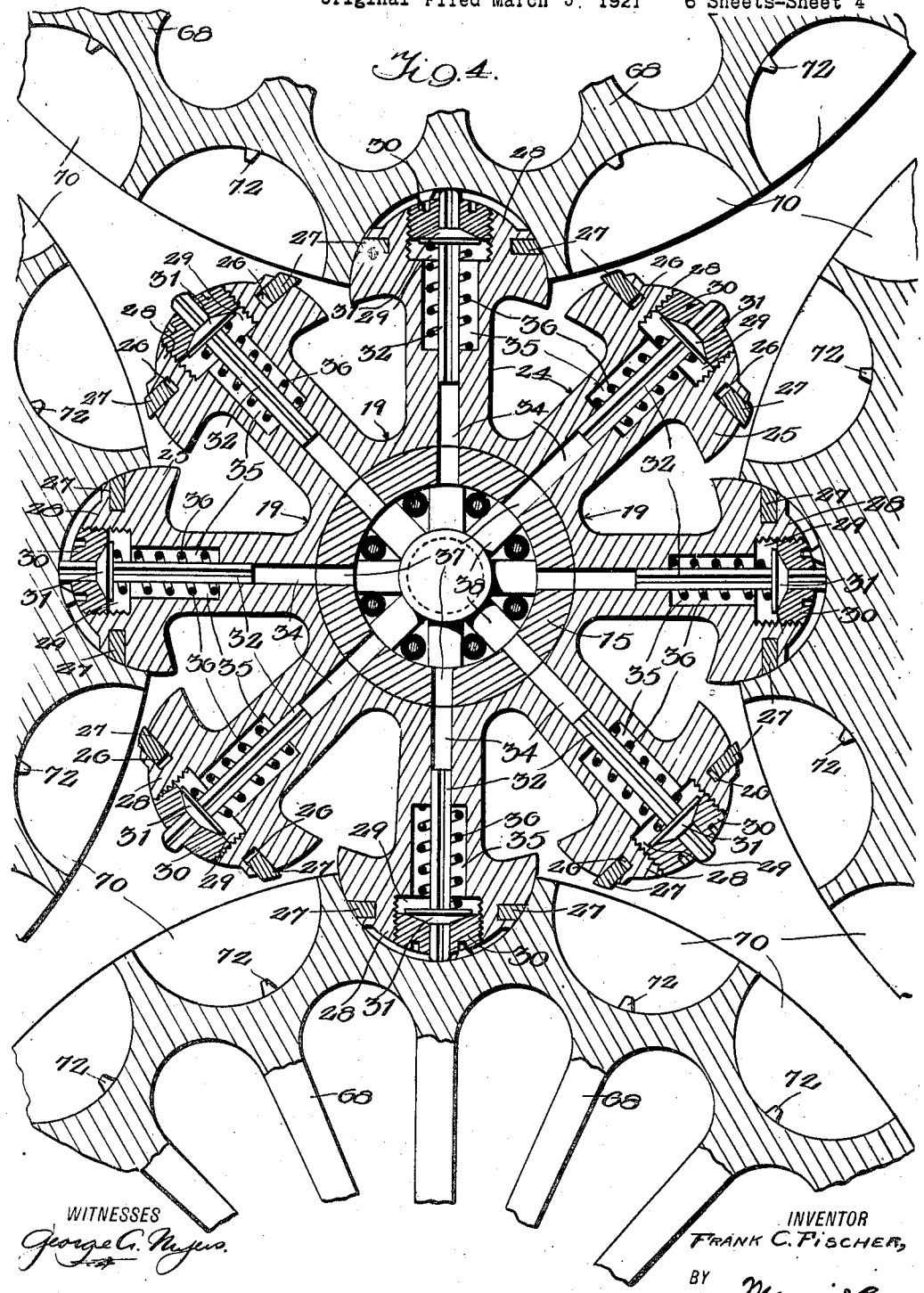
WITNESSES
INVENTOR
FRANK C. FISCHER,
BY
ATTORNEYS

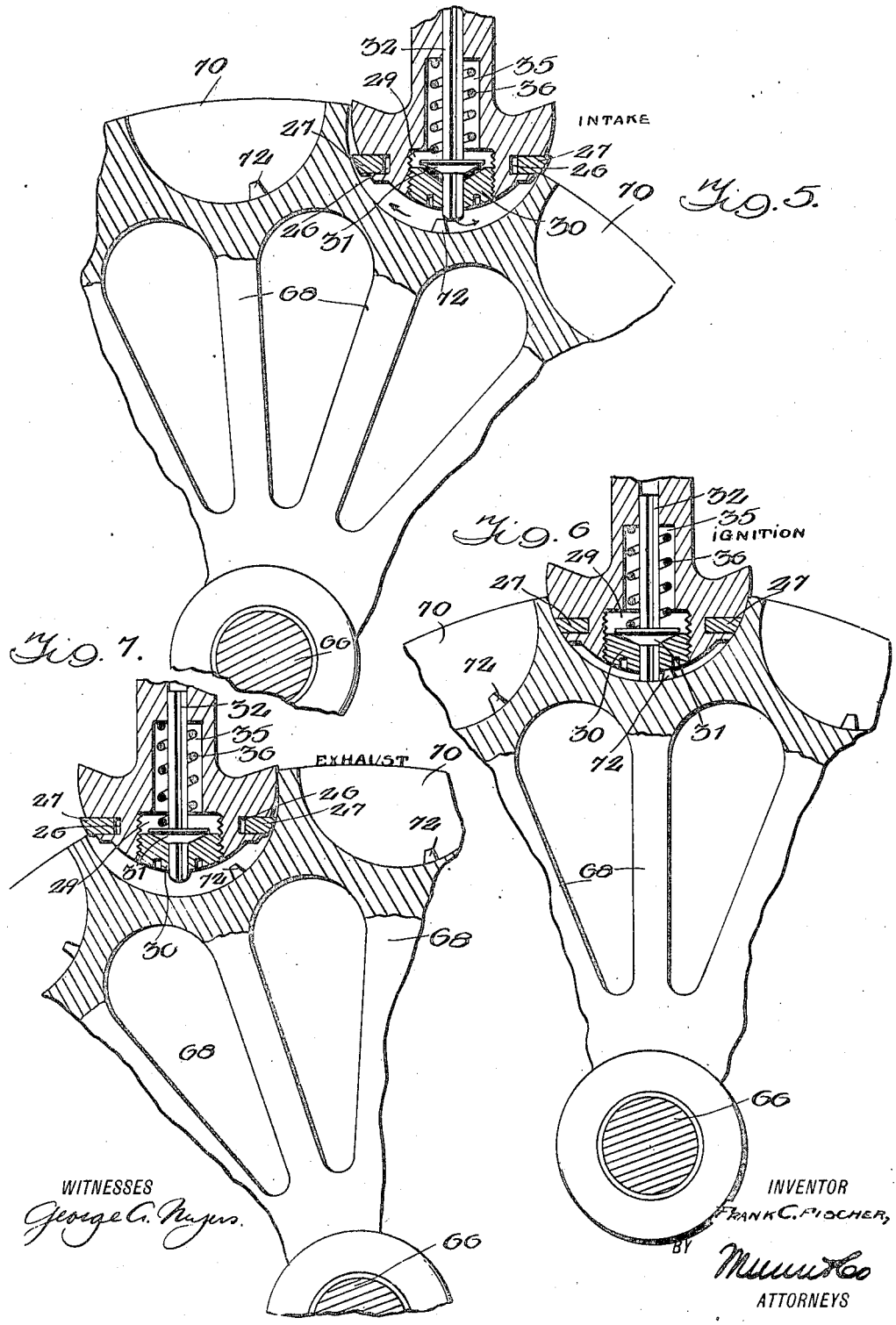

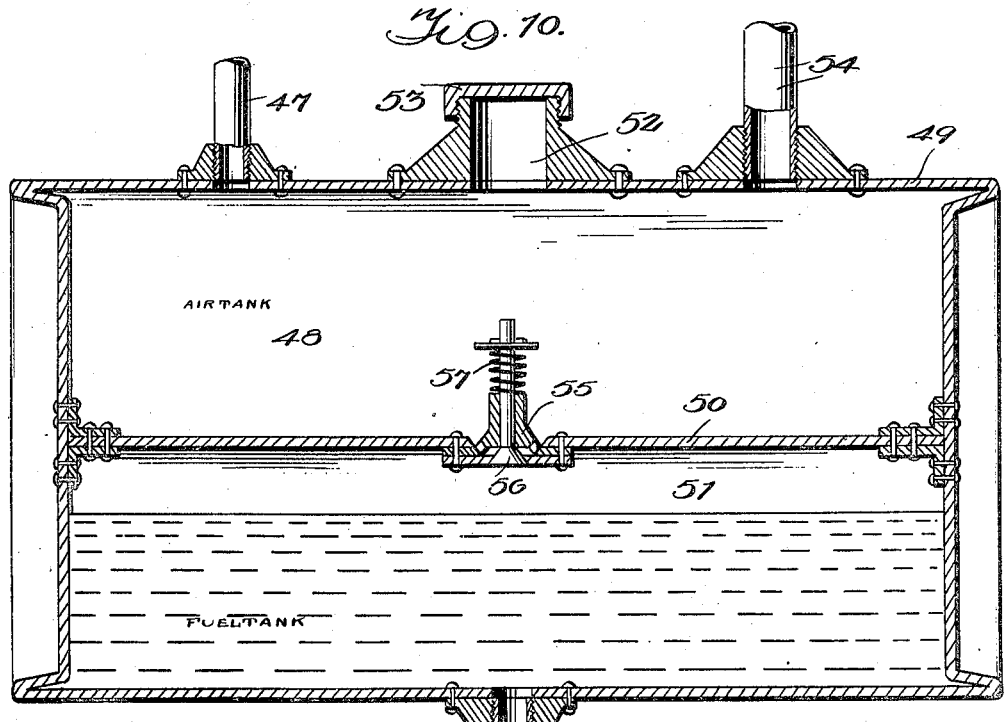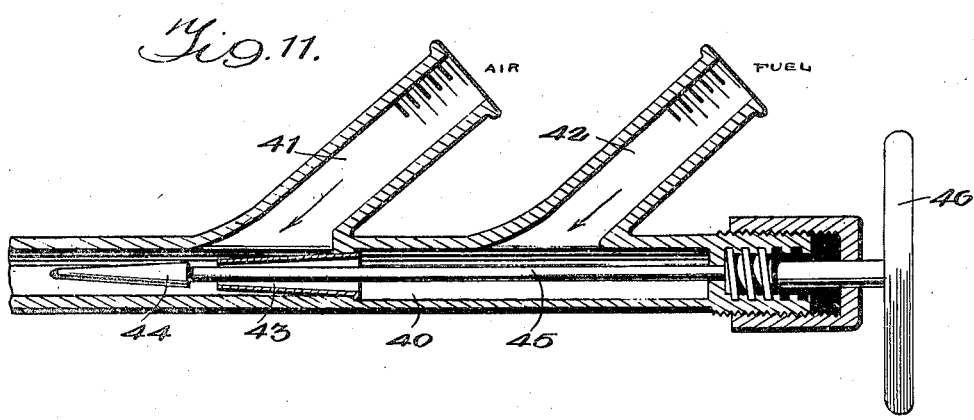

Patented May 13, 1924.

1,493,745

UNITED STATES PATENT OFFICE.

FRANK C. FISCHER, OF SAN ANTONIO, TEXAS.

ROTARY MOTOR.

Application filed March 5, 1921, Serial No. 449,734. Renewed August 1, 1923.

*To all whom it may concern:*

Be it known that I, FRANK C. FISCHER, a citizen of the United States, and a resident of San Antonio, in the county of Bexar and State of Texas, have invented certain new and useful Improvements in Rotary Motors, of which the following is a specification.

My present invention relates generally to rotary motors, and more particularly to motors of this type of small displacement, in connection with the operation of which a series of light power impulses are developed with sufficient rapidity to insure a practically steady torque with an economical high speed, limited only by the mechanical strength of the motor as against centrifugal force to which the revolving parts are of course subject.

A further object is the provision of a motor which by slight change in the timing of the admission valves, may be adapted for operation with steam or air instead of with a combustible mixture as in the following outline of the invention.

A still further object is the provision of a motor of the above type wherein by the utilization of pressure less expansively than in the ordinary motor, fuel consumption is reduced to a minimum and the main volume at least of lubricant may be mixed with and introduced by the fuel supply to the motor.

A still further object is the provision of a motor in which the external dimensions are small and the parts not only extremely light in weight but, for the major part are duplicates of one another, permitting of economical manufacture of the parts in large numbers.

A still further object is the provision of a motor of the above type in which provision is made for a natural cooling by air and the elimination of the weight and bulk of water cooling apparatus as well as the weight and bulk of large capacity fuel tanks now commonly necessary.

In the accompanying drawings illustrating my present invention and forming a part of this specification.

Figure 1:
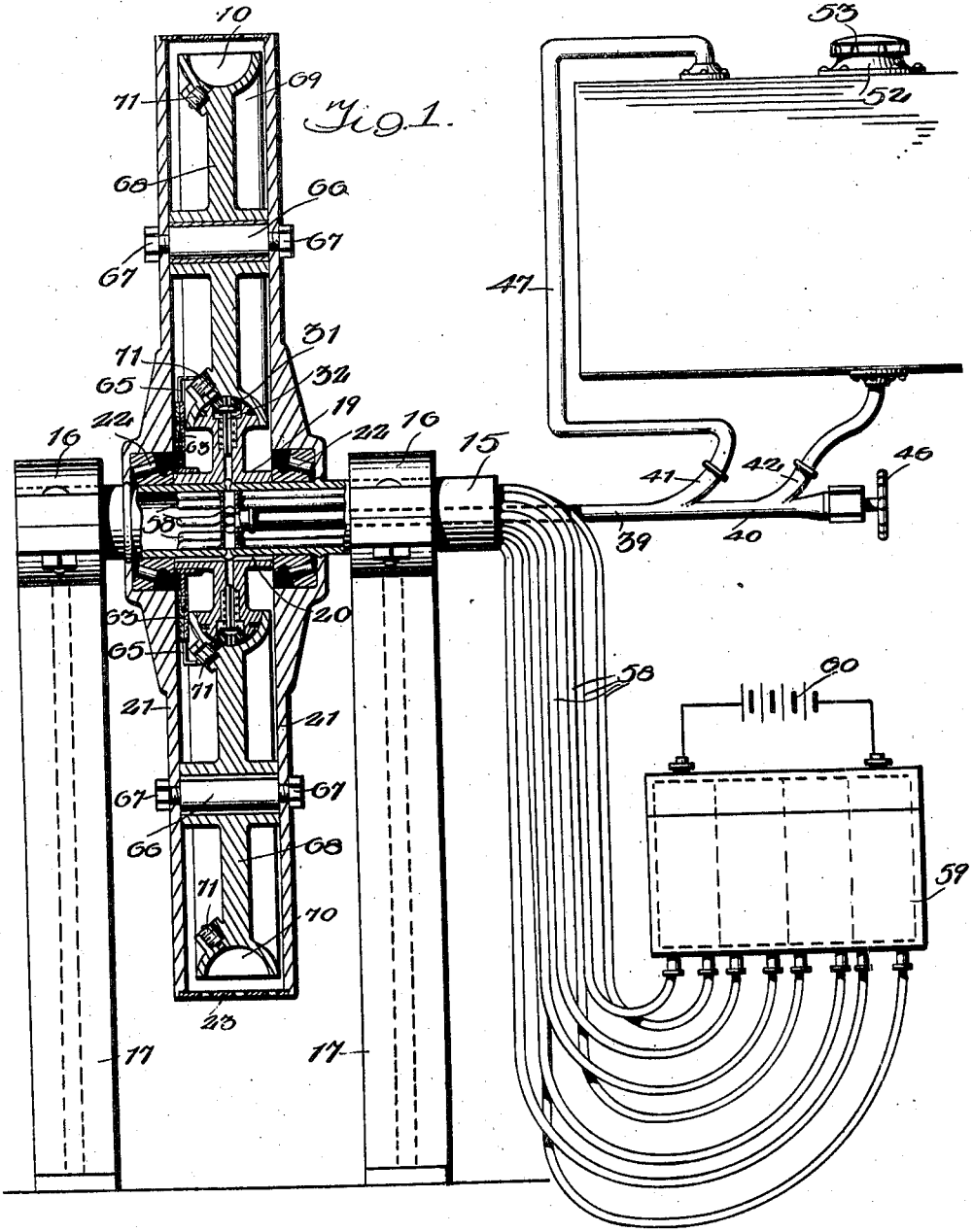
Figure 2:
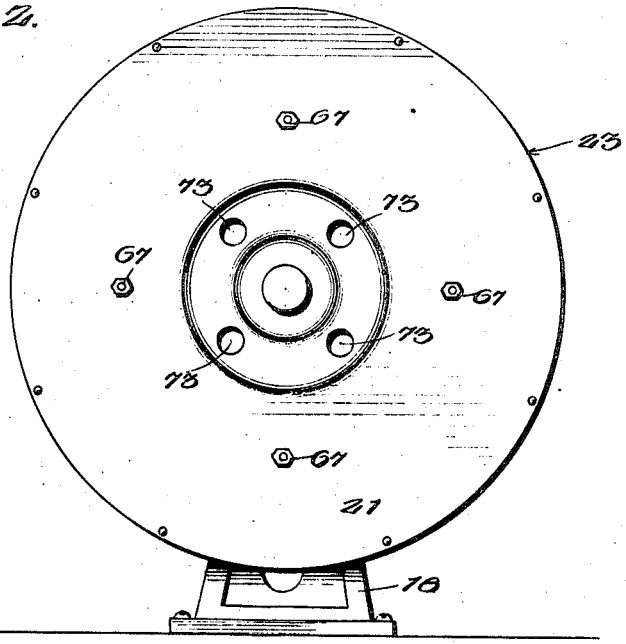
Figure 8:
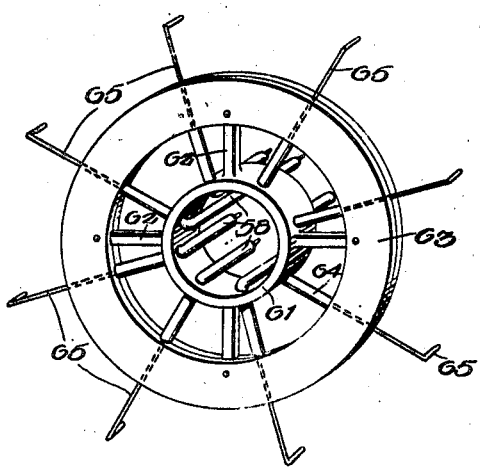
Figure 9:
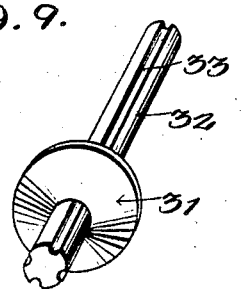
Figure 3:
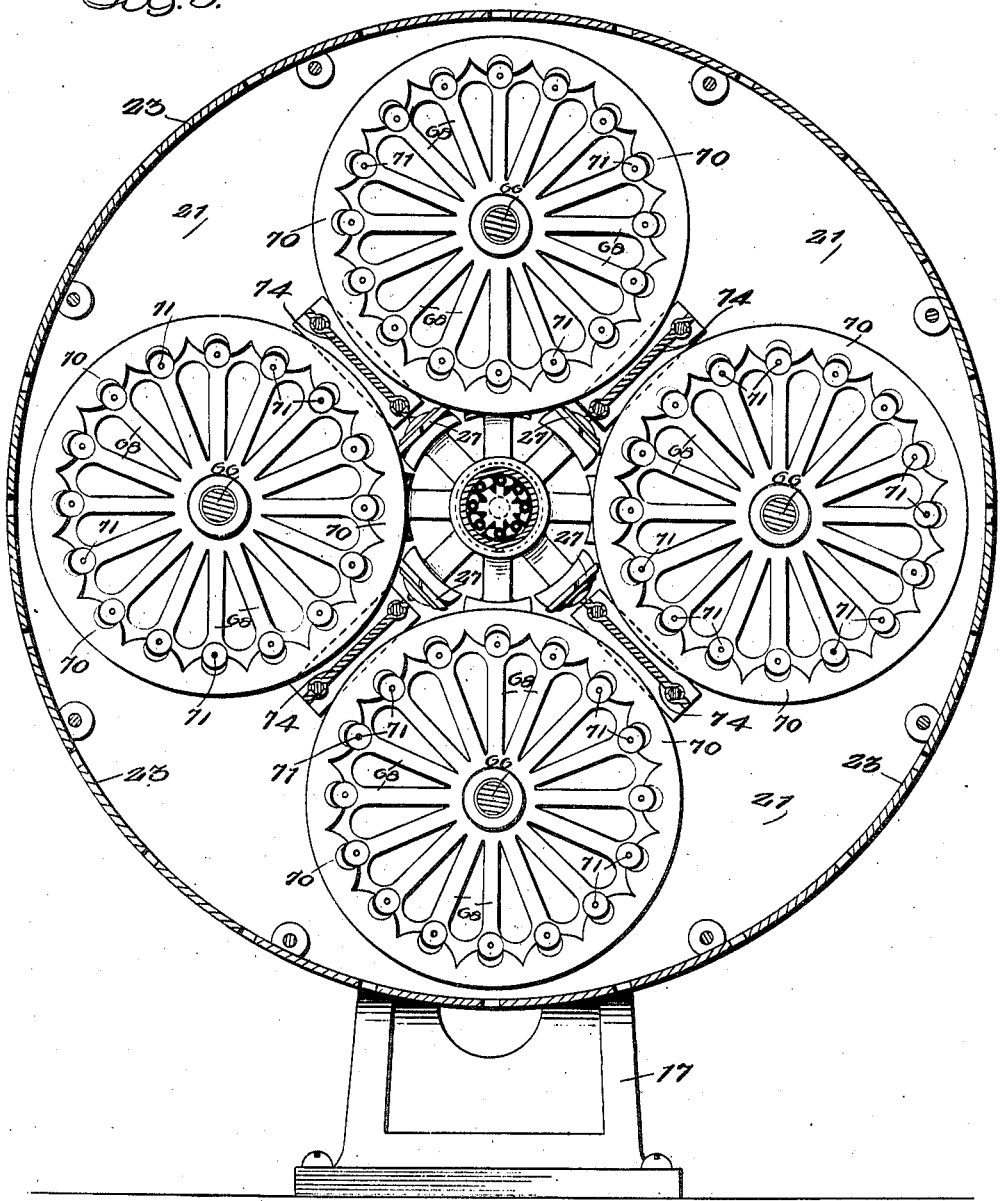

Figure 1 is a view of the complete apparatus showing the fuel supply and ignition means in a more or less diagrammatic manner and illustrating the motor itself in vertical transverse section, Figure 2 is a side view of the motor, Figure 3 is an enlarged sectional side view of the motor, Figure 4 is an enlarged section through the central portion of the motor, Figures 5, 6 and 7 are detail sections through portions of the motor showing the parts respectively in the intake, firing and exhaust positions, Figure 8 is a detail perspective view illustrating the spark distributing means, Figure 9 is a detail perspective view of one of the valves, Figure 10 is a sectional view through the fuel tank, and Figure 11 is a longitudinal section through the fuel atomizer and mixer.

Referring now to these figures and particularly to Figure 1, my improved motor comprises a stationary hollow axial shaft 15, rigidly clamped and supported in the upper portions 16 of spaced parallel uprights or standards 17, or which may if desired be rigidly supported in connection with a single standard or upright 18 as in Figure 2. In either instance a spider 19 is secured around the hollow shaft 15, as by means of a key 20, between the side plates 21 of a housing of the cylindrical form plainly seen by a comparison of Figures 1 and 2, whose central portions have bearings 22 on the shaft 15 and whose outer edges are connected by an apertured peripheral exhaust plate 23.

Referring now to Figure 4, the spider 19 which forms the stator has a series of radially outstanding arms 24, preferably eight in number, and the outer end of each arm 24 carries an enlarged semispherical head 25 annularly grooved as at 26 for the reception of a piston ring 27, and whose surface is cut away as at 28 beyond the piston ring 27 and around an enlarged axial and internally threaded bore 29, which latter receives an axially apertured plug 30. This plug has a valve seat at the inner end of its aperture, for the reception of the valve 31 carried upon a stem 32 whose outer portion works through the aperture of the plug 30 and whose outer extremity projects beyond the surface of the plug and beyond the adjacent surface of the piston head 25 when the valve 31 is in the normal seated position.

Each valve stem 32 as particularly shown in Figure 9 has lengthwise surface grooves 33 permitting of the passage of fluid when the valve 31 is open, and the inner portion of each of the valve stems projects inwardly into an axial bore 34 of its respective spider arm or piston 24, and through a counterbore 35 in the latter of which a spring 36 is located, which bears against the valve 31 and normally holds the latter in seated position. The bore 34 of each piston arm 24 communicates at its inner end with a registering aperture 37 of the hollow shaft 15, and through this aperture with one of the radiating nipples 38 of a fluid supply pipe 39, the latter of which extends axially into one end of the shaft 15 from a fuel mixer and atomizer 40 which as particularly shown in Figure 11 has lengthwise spaced branch tubes 41 and 42 respectively for the supply of air and liquid fuel, and has a nozzle 43 between these branches, controlled by the valve 44 of a stem 45 provided with an external handle 46. Branch 41 receives one end of an air pipe 47 extending from the upper air compartment 48 of a fuel and air tank 49 divided by a partition 50 disposed horizontally therein to form the upper air compartment and a lower fuel compartment 51. The fuel intake opening 52 which leads into the air compartment is normally closed by a cap 53 and an air supply pipe 54 also communicates with the air compartment 48, partition 50 having a central opening in which is secured a valve cage 55 supporting a valve 56 adapted to open toward the fuel compartment 51 and normally closed by a spring 57. Thus liquid fuel introduced through the fuel intake opening 52 will be forced into the fuel compartment 51 by the air pressure in the air compartment 48 and will at the same time be prevented from returning to the air compartment by the valve 56. Furthermore the pressure will be equalized in the two compartments and thus air and fuel will be separately fed to the branches 41 and 42 of the atomizer and air and the fuel spray intermittently mixed in the course of passage through pipe 39 for delivery to the several piston bores 34.

In a like manner the several secondary leads 58 of the ignition apparatus, which project from a coil 59, preferably in the nature of a constant vibrator, supplied with current from a battery 60, project through the hollow shaft 15 around the mixture supply pipe 39 and have their inner ends extended radially through openings in the said shaft and through registering apertures in the inner band or hub 61 of a distributor. This band or hub 61 as particularly shown in Figure 8, which is secured around the shaft and also around the hub portion of the stator 19, has radial arms 62 supporting a pair of radially abutting detachably connected rings 63 between which the radially outstanding portions 64 of the several secondary leads 58 are clamped. The extremities of these leads project beyond the nonconducting rings 63 and are bared and provided with angular extensions 65 thus disposed in an annular series and projecting toward the median plane of the stator at points beyond the several piston arms 24.

The side plates 21 of the housing constitute a part of the rotor, from which power may be taken in any suitable manner as for instance by attaching ring gears to the housing, pulleys and the like, these side plates having secured therethrough the opposite ends of annularly spaced shafts 66, the opposite ends of which may be reduced and threaded as seen in Figure 1 for extension through the side plates and connection thereto by nuts 67 so that the shafts 66 not only serve to brace the side plates in their spaced relation but also to form the axes of rotation for a series of peripherally chambered wheels 68, revoluble with the housing around the stator 19 and independently rotatable by virtue of engagement with the stator in a manner which will be presently described.

Each of the revoluble series of wheels 68 has a laterally enlarged rim portion 69, provided with an annular series of approximately semispherical exteriorly opening pockets or piston chambers 70, spaced apart in their annular relation coincident with the spacing of the heads 25 of the piston arms 24.

Around one side, each of the wheels 68 has an annular series of inclined threaded bores for the reception of spark plugs 71 and each of these spark plugs comes into action as it registers with one of the terminals 65 of the sparking leads, with which it coacts without actual contact.

There being four wheels 68 in all, with the firing terminals opposite the several piston arms, it is obvious the parts are in the firing position as shown in Figure 4 at a time when the several parts are at the dead center position although the actual impulse of the explosions necessarily occurs when the rotor is slightly past the dead center position.

As each piston head 25 is initially received within one of the peripheral cavities 70 with one of the rotating wheels 68 in the position shown in Figure 5, the movement being a rolling one, brings about effective guiding of the piston ring 27 into close contact with the wall of the cavity, and it will be noted that in this movement the extreme outer end of the valve stem 32 comes into contact with a boss 72 disposed within the cavity at one side of its center whereby the valve 31 is open to supply the combustible mixture into the space between the recessed end of the respective piston head and that portion of the cavity within the contacting area of the piston ring 27. It will further be noted from Figure 5 that the parts in this position are necessarily in somewhat more widely spaced relation than later as the shaft 66 of the respective wheel 68 approaches the line of the axis of the respective piston arm 24. This latter movement will be understood by a comparison of Figures 5 and 6, in the latter position of which the parts are ready to fire, the end of valve rod 32 having passed over the boss 72 so that the valve 31 is closed when the charge is ignited. The parts thus receive the power impulse of the explosion just as they pass the dead center and it is quite obvious that during their continuing movement the compression and combustion space gradually enlarges toward the position shown in Figure 7 where as the piston ring 27 shifts out of the opposite side of the cavity with respect to that side it has previously entered, the burned charge exhausts into the space within the housing or casing. As the rotor continues to revolve, the wheels 68 continue to mesh in their rotation with the rotor and continue to receive power impulses immediately following each alinement of the axes of the several wheels with the axes of the several piston arms 24 so that power impulses will thus occur eight times in each complete revolution and each power impulse is the combination of four explosions at spaced points around the stator.

Due to the centrifugal motion of the rotor the burned and exhausted gases are thrown out of the housing through its peripheral exhaust plate 23, along with air which is taken into the housing through series of air intake openings 73 of the side plates 21 around the hub portion thereof, and this movement of the burned gases and air is preferably assisted by the disposition of paddles or blades 74 radially of the housing and transversely between and secured to the side plates 21 as seen in Figure 3 whereby they not only assist in the discharge of the parts of combustion and in the cooling of the motor, but also serve to assist in the rigid connection of the side plates 21 in rigid relatively immovable relation.

In connection with my improved motor, the construction and operation of which will it is thought be plain from the foregoing description, I contemplate that by varying the action of the intake valve as for instance by differently positioning the valve opening bosses, it is possible to adapt the motor with equal facility and effectiveness in connection with air, steam or other propelling medium and that by the utilization of an adjustable spark gap in the coil 59 I will not only be able to avoid the danger of punctured coils but will be in a position to utilize this spark gap in governing the distance the current will jump to the ignition plugs and thus bring about advances or retardation of the sparks without shifting the distributor.

I claim:

1. A motor of the character described including a hollow shaft having a plurality of radial openings, a stator including a hub secured on the shaft and a plurality of radially outstanding arms each provided with a lengthwise bore communicating at its inner end with one of the openings of the shaft, a pipe leading axially within the shaft and having a series of radial nipples also in communication with the openings of the shaft for the supply of fluid to the hollow arms of the stator, each of said stator arms terminating at its outer end in an enlarged semispherical piston head having a counterbore at the outer end of the bore of the arm, an apertured plug seated in the counterbore and having an inner valve seat, a valve disposed against said seat for the control of the fluid, having a stem projecting outwardly through the said plug, each of said piston heads having an annular groove and a recessed end beyond the groove, a piston ring seated in the groove, and a rotor including a series of independently rotatable members revoluble around the stator and provided with peripheral cavities to receive the piston head having internal bosses engageable with the outer projecting ends of the valve stems.

2. A motor of the character described including a hollow shaft having a plurality of radial openings, a stator including a hub secured on the shaft and a plurality of radially outstanding arms each provided with a lengthwise bore communicating at its inner end with one of the openings of the shaft, a pipe leading axially within the shaft and having a series of radial nipples also in communication with the openings of the shaft for the supply of fluid to the hollow arms of the stator, each of said stator arms terminating at its outer end in an enlarged semispherical piston head having a counterbore at the outer end of the bore of the arm, an apertured plug seated in the counterbore and having an inner valve seat, a valve disposed against said seat for the control of the fluid, having a stem projecting outwardly through the said plug, each of said piston heads having an annular groove and a recessed end beyond the groove, a piston ring seated in the groove, and a rotor including a series of independently rotatable members revoluble around the stator and provided with peripheral cavities to receive the piston head having internal bosses engageable with the outer projecting ends of the valve stems, said rotor also including side plates revoluble around the shaft, having a peripheral apertured exhaust plate, and between which the said rotatable members are mounted.

3. A motor of the character described including a hollow shaft having a plurality of radial openings, a stator including a hub secured on the shaft and a plurality of radially outstanding arms each provided with a lengthwise bore communicating at its inner end with one of the openings of the shaft, a pipe leading axially within the shaft and having a series of radial nipples also in communication with the openings of the shaft for the supply of fluid to the hollow arms of the stator, each of said stator arms terminating at its outer end in an enlarged semispherical piston head having a counterbore at the outer end of the bore of the arm, an apertured plug seated in the counterbore and having an inner valve seat, a valve disposed against said seat for the control of the fluid, having a stem projecting outwardly through the said plug, each of said piston heads having an annular groove and a recessed end beyond the groove, a piston ring seated in the groove, and a rotor including a series of independently rotatable members revoluble around the stator and provided with peripheral cavities to receive the piston head having internal bosses engageable with the outer projecting ends of the valve stems, said rotor also including a housing for the stator, within which the said rotatable members are mounted, the housing being revoluble on the shaft and having peripheral openings and openings adjacent to and around the shaft, whereby to cool the motor through centrifugal movement of air in the casing.

4. A motor including a stator having an annular series of outstanding piston supports, pistons carried by the said supports, said supports having valve controlled fluid supply means for the pistons including spring controlled valves having stems projecting through and beyond the pistons, and a rotor including a series of independently rotatable members revoluble around the stator, having peripheral piston cavities and provided with means for automatically actuating the valves of the pistons.

5. A motor including a stator having an annular series of outstanding piston supports, pistons carried by the said supports, said supports having valve controlled fluid supply means for the pistons including spring controlled valves having stems projecting through and beyond the pistons, and a rotor including a series of independently rotatable members revoluble around the stator, having peripheral piston cavities and provided with means for automatically actuating the valves of the pistons, ignition plugs carried by the several rotating members opposite to and communicating with their said cavities, and charge firing means including a stationary series of contact elements stationarily supported by the stator adjacent to its several pistons and into and out of the influence of which the ignition plugs of the rotatable members are movable during rotation of said members in their revolution about the stator.

6. A motor including a stator having an annular series of piston forming members provided with automatically controlled fluid supply means, and a rotor including a series of independently rotatable members revoluble around the stator and having peripheral series of piston receiving cavities into and out of which the piston forming members have rolling movement.

7. A motor including a stator having an annular series of piston forming members and provided with automatically controlled fluid supply means leading to said members, and a rotor having a series of independently rotatable members revoluble around the stator and provided with peripheral cavities to receive the piston forming means, provided with means for actuating the fluid supply means of the stator as described.

8. A motor including a stator having an annular series of piston forming members and provided with automatically controlled fluid supply means leading to said members, and a rotor having a series of independently rotatable members revoluble around the stator and provided with peripheral cavities to receive the piston forming means, provided with means for actuating the fluid supply means of the stator, said rotor also including a housing for the stator and the rotating members, revoluble with the latter.

9. A motor including a stator having an annular series of piston forming members and provided with automatically controlled fluid supply means leading to said members, and a rotor having a series of independently rotatable members revoluble around the stator and provided with peripheral cavities to receive the piston forming means, provided with means for actuating the fluid supply means of the stator, said rotor also including a housing for the stator and the rotating members, revoluble with the latter and having means to discharge the exhaust and cool the motor by centrifugal action of the rotor.

10. A motor including a stator having radiating arms terminating in piston heads, and a rotor revoluble around the stator, including a housing and independently rotatable members within the housing revoluble in contact with the stator, having peripheral cavities to receive the said piston heads, said rotatable members having ignition plugs in communication with their cavities, and electrical connections for actuating the ignition plugs including a rigid series of contact elements disposed adjacent to the piston heads.

11. A motor including a stator having an annular series of piston forming members provided with automatically controlled fluid supply means, a rotor including a housing revoluble around the stator, a series of independently rotatable members within and revoluble with the housing, movable in contact with the stator and having peripheral series of piston receiving cavities, said housing having side plates and provided with peripheral openings and with openings around their axes, and blades connected to the side plates and disposed radially across and within the housing to assist in the centrifugal movement of air through the housing.

FRANK C. FISCHER.